INVENTOR.
HARRY SCHEFFER
BY Kelman and Berman

AGENTS

United States Patent Office 3,520,342
Patented July 14, 1970

3,520,342
SELF-LOCKING THREADED FASTENER
Harry Scheffer, Brackwede, Germany, assignor to Helmut Rieke, Thal uber Bad Pyrmont, Germany
Filed Oct. 1, 1968, Ser. No. 764,263
Claims priority, application Germany, May 27, 1968, 1,750,702
Int. Cl. F16b 39/34
U.S. Cl. 151—7                                                                 7 Claims

ABSTRACT OF THE DISCLOSURE

The radial seating face of a nut has a shallow annular recess about the threaded bore from which even shallower radial grooves extend in a radially outward direction into the residual flat portion of the seating face. A sealing ring of resilient material conformingly occupies the recess and axially projects from the same while relaxed. The relaxed ring leaves the grooves substantially free to accept displaced material of the ring when the latter is pressed into the recess by a fastened element in the assembled condition of the nut.

BACKGROUND OF THE INVENTION

This invention relates to self-locking and sealing fasteners, and particularly to nuts and bolts having resilient sealing rings of organic polymeric material bonded to their radial seating faces.

In the basically known type of threaded fastener to which this invention pertains, an annular resilient element is compressed when the fastener is tightened to form a seal about the threads and to lock the threads to each other by resilient axial forces. The pressure exerted by the confining metal elements on the material of the sealing ring is normally sufficient to cause the polymer to flow as a viscous liquid. Such flow is desirable as far as it enhances the conforming engagement of the ring with the threadedly engaged elements. In the known fasteners some sealing material also enters the gap between opposite radial seating faces of the metal elements and prevents effective metal-to-metal contact.

Because the coefficient of friction between polymer and metal is much lower than that between metal and metal, the torque applied by a tightening tool is not absorbed by the seating faces if they are separated by a film of organic polymer, but is fully applied to the threads which may thereby be deformed or even stripped if a torque sufficient for adequate sealing is applied.

An object of this invention is the provision of threaded fasteners of the type described which permit a tight seal to be obtained between the fastener and another element engaged thereby, but whose threads are protected against inadvertent damage during tightening.

SUMMARY OF THE INVENTION

With this object and others in view, as will hereinafter become apparent, the invention in one of its aspects mainly resides in a fastener whose body portion is formed with a helical thread about an axis and has a seating face in a plane perpendicular to the axis. An annular recess which extends about the axis radially adjacent the thread has a bottom wall transverse of the axis and axially spaced from the afore-mentioned plane inwardly of the body portion. A main portion of the recess is filled by a sealing ring of resilient plastic which leaves a reserve portion of the recess empty while the ring is in the relaxed condition. The reserve portion of the recess is of sufficient size to permit the material of the ring to be radially contained in the recess between the thread and the residual portion of the seating face which constitutes an annular outer rim about the recess when the ring is compressed axially by a flat contact face extending in the afore-mentioned plane while abuttingly engaging the rim and covering the recess.

Other features, additional objects, and many of the attendant advantages of this invention will readily be appreciated as the same becomes better understood by reference to the following detailed description of a preferred embodiment when considered in connection with the appended drawing.

DESCRIPTION OF THE PREFERRED EMBODIMENT

Figure 1:
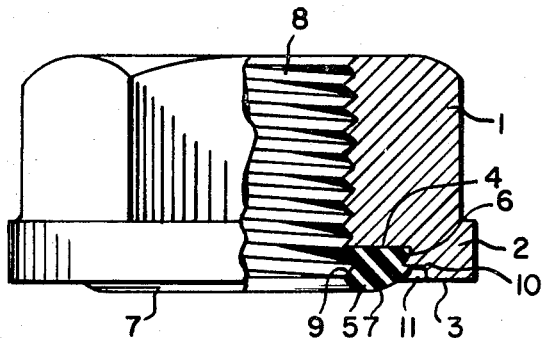
FIG. 1 shows a self-locking sealing nut of the invention in elevation and partly in elevational section on its axis.
Figure 2:
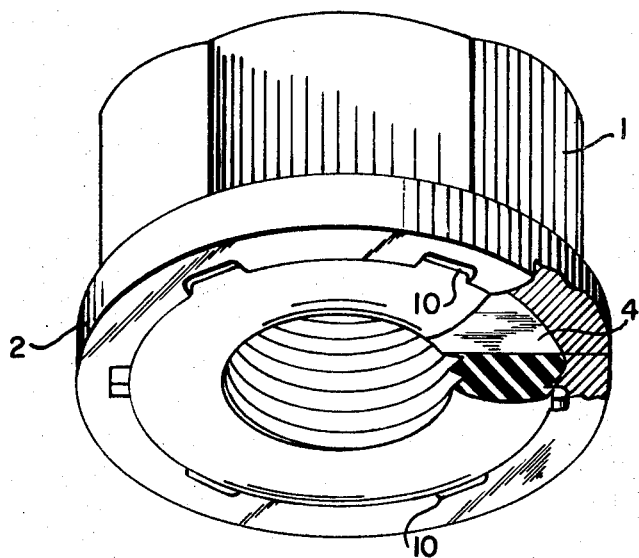
FIG. 2 shows the nut of FIG. 1 in a perspective view, a portion of the nut being broken away to reveal internal structure.

Referring now to the drawing in detail, and initially to FIGS. 1 and 2, there is seen a nut whose steel body portion 1 is of generally hexagonal cross section. A narrow, integral collar 2 at one axial end of the body portion is cylindrical about the axis of the nut and provides the nut with a seating face of circular circumference. An annular recess in that face extends radially outward from the central bore of the nut and leaves only a residual face portion 3 which is annular and planar and defines the seating plane of the nut.

The bottom wall 4 of the recess is offset from the seating plane in a direction axially inward of the body portion 1 by a distance which is about two thirds of the average radial distance between the side wall 6 of the recess and the pitch circle of the threads 8 in the body portion 1 and not significantly greater than the minimum distance between the threads 8 and the side wall 6. The side wall flares in an axially inward direction and is circular in cross section.

Six identical grooves 10 extend radially outward from the side wall 6 into the residual seating face portion 3. They are equiangularly spaced about the axis of the nut, and their depth is less than one half of the depth to the bottom wall 4 in the main portion of the recess. Their combined circumferential width is about 90°.

A ring 5 of polyamide resin composition fills the main portion of the annular recess and is conformingly bonded to the bottom wall 4 and the side wall 6 of the recess. Slightly more than one turn of a thread 9 forms the inner annular wall of the ring 5. In the relaxed condition of the ring illustrated in FIGS. 1 and 2, the pitch and pitch diameter of the thread 9 are identical with the corresponding dimensions of the thread 8 in the metallic body portion 1 of the nut.

The resin composition of the ring 5 extends partly into the grooves 10, leaving most of each groove free as a reserve space 11 the purpose of which will presently become apparent. In its relaxed condition, the ring 5 projects axially beyond the seating plane, the projecting portion 7 being toroidally curved.

Figure 3:
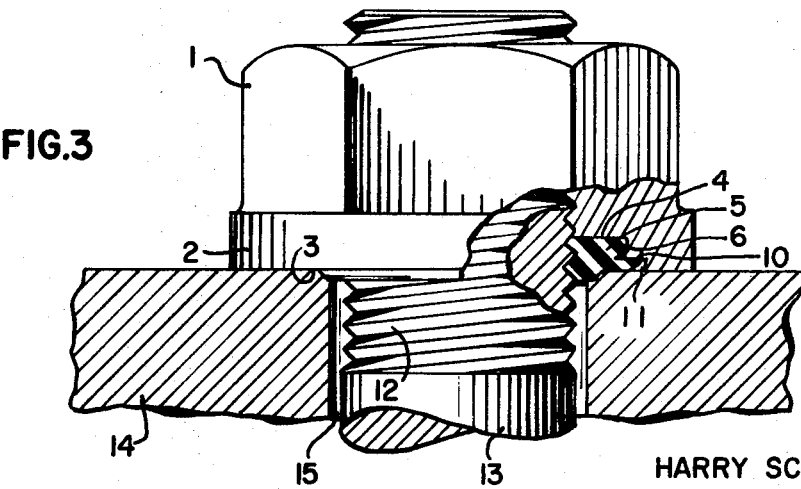
FIG. 3 shows the nut in fastening cooperation with other structural elements in elevation and partly in section.

FIG. 3 illustrates the nut of FIGS. 1 and 2 engaging the male thread 12 of a bolt 13 for fastening two plate-shaped work pieces to each other, only one work piece 14 and the free shank end of the bolt 13 being seen in the drawing. The bolt 13 passes freely through a bore 15 of the work piece 14 whose orifice adjacent the nut is chamfered.

During tightening of the nut on the bolt 13, the resin composition of the ring 5 flows partly into the orifice of the bore 15 and partly into the grooves 10 so as to occupy much of the reserve space 11 shown in FIG. 1. What is left of the reserve space in the assembly illustrated in FIG. 3 could have received additional resin material if the seating face of the work piece 14 had completely covered the recess in the nut from the threads to the residual face portion 3 in the seating plane defined by the face portion 3.

Flow of the plastic material toward the threads 12 and partly into the bore 15 to seal the bore is favored by the illustrated and described configuration of the recess in the nut and by the fixed bond between the sealing ring 5 and the bottom and side walls 4, 6 of the recess. Radially outward flow of the resilient plastic does not begin until the plastic conformingly engages all available surfaces of the thread 12 and of the bore 15. When radially outward flow begins, the flow section of the grooves 10 is much greater than that of the still existing gap between the seating face 3 and the opposite seating face of the work piece 13. The plastic displaced during ultimate closing of the gap flows only into the grooves 10. No detectable traces of plastic are found on the face 3 and on the opposite seating face of the work piece 13 when the elements seen in FIG. 3 are again disassembled.

When the nut is tightened with a torque wrench in the usual manner, resistance to further turning is found to increase abruptly when the metallic seating faces engage each other. They are kept tightly engaged, and loosening of the nut by vibration is prevented by the resilient axial forces exerted by the compressed plastic material of the ring 5 which is not significantly reduced by the remaining reserve space 11 in the grooves 10 because of the fixed bonded connection between the plastic and the walls 4, 6 of the recess in the nut. The bond is protected against shear stresses during tightening of the nut by the engagement of integral radial projections of the ring 5 with the grooves 10.

The collar 2 permits an axially shallow and radially wide recess in the seating face of the nut to be formed with an adequate cross section and still to make the residual face 3 so wide that the contact pressure between the residual face portion 3 and the opposite face of the work piece 14 is relatively low. The metallic body portion of the nut of the invention is not deformed during tightening. The nut may therefore be released from the bolt 13 and again attached without significant loss in its locking and sealing effectiveness if the bore 15 is dimensioned to accept only a relatively small portion of the plastic material from the ring 5 during tightening of the nut, as exemplified in the arrangement of FIG. 3.

The sealing ring 5 is preferably made from polyamide powder which is compressed and presintered into an annular body suitable for partial insertion into the recess of the metallic body portion 1 which the same is mounted on a smooth upright spindle. The body portion is heated by electric induction currents beyond the melting point of the plastic, causing the resin composition to fill the recess and to weld to the walls 4, 6. The projecting portion 7 assumes its toroidal shape because of surface tension effects which also impede entry of the molten resin into the grooves 10. The nut is removed from the spindle after solidification of the resin, and a thread cutter is inserted to clean the thread 8 in the body portion and to cut the thread 9 in the ring 5.

Polyamide resins combine desirable mechanical strength with resiliency and the ability of bonding directly to steel by heating. Other organic polymers may be employed, particularly when the metal of the body portion is not steel, and the use of natural or synthetic rubber compositions is specifically contemplated in combination with body portions 1 which consist of brass or are brass plated.

While the invention has been described with specific reference to a nut, the above teachings are also applicable to a bolt having a radial seating face on its head about the threaded stem.

I claim:
1. A fastener comprising:
 (a) a body portion formed with a helical thread about an axis and having a seating face in a plane perpendicular to said axis,
  (1) said face being formed with an annular recess therein extending about said axis adjacent said thread in a radial direction,
  (2) said recess having a bottom wall transverse of said axis and axially spaced from said plane inwardly of said body portion,
  (3) a residual portion of said face in said plane constituting an annular rim bounding said recess in a radially outward direction, and
 (b) a sealing ring of resilient material in said recess and filling a first portion of said recess while leaving a second portion of the recess empty when said sealing ring is in the relaxed condition,
  (1) said ring conformingly engaging said bottom wall in area contact when in said relaxed condition and being fixedly bonded to said bottom wall,
  (2) a portion of said sealing ring when in said relaxed condition projecting from said recess in the direction of said axis beyond said plane,
  (3) said second portion of said recess being of a size sufficient to permit the material of said ring to be radially contained in said recess between said rim and said thread when said ring is compressed axially by a contact face extending in said plane while abuttingly engaging said rim and covering said recess,
  (4) said body portion being formed with a plurality of grooves in said face, said grooves being circumferentially spaced from each other, extending radially outwardly from said first portion of said recess, and jointly constituting the second portion of said recess,
  (5) each groove having an axial depth considerably smaller than the axial spacing of said bottom wall from said plane.

2. A fastener as set forth in claim 1, wherein said residual portion of said sealing face is planar in said plane.

3. A fastenetr as set forth in claim 1, wherein said ring is formed with a helical female thread about said axis substantially identical in pitch and diameter with said thread formed on the body portion when said ring is in said relaxed condition.

4. A fastener as set forth in claim 3, wherein said recess has an axially extending annular side wall, said ring conformingly engaging said side wall and said bottom wall in area contact when in said relaxed condition, the axial height of said side wall from said bottom wall to said plane being not substantially greater than the radial spacing of said side wall from said thread in said ring.

5. A fastener as set forth in claim 4, wherein said residual portion of said sealing face is planar in said plane; and said side wall flares in an axial direction from said plane toward said bottom wall.

6. A fastener as set forth in claim 1, wherein said body portion is of substantially polygonal cross section over a major portion of the axial length thereof, and a collar at an axial end of said body portion having a cross section greater than said polygonal cross section, said collar projecting radially outward beyond said portion of polygonal cross section and constituting at least a portion of said residual face portion.

7. A fastener as set forth in claim 1, wherein said recess has an axially extending annular side wall, said ring conformingly engaging said side wall in area contact when in said relaxed condition, said sidewall extending in an axial direction from said plane to said bottom wall and flaring in said axial direction.

References Cited

UNITED STATES PATENTS

| | | | |
|---|---|---|---|
| 3,040,796 | 6/1962 | Gouverneur | 151—7 |
| 3,203,459 | 8/1965 | Coldren | 151—7 |
| 3,265,107 | 8/1966 | Glicksman | 151—7 |
| 3,399,589 | 9/1968 | Breed | 151—7 X |

RAMON S. BRITTS, Primary Examiner